United States Patent

[11] 3,575,073

[72] Inventors Robert C. Zeller
643 Clinton St.,
Warren W. Weible, 635 Holgate Ave.,
Defiance, Ohio 43512
[21] Appl. No. 817,210
[22] Filed Feb. 10, 1969
Division of Ser. No. 623,938, Mar. 17, 1967,
Pat. No. 3,503,287.
[45] Patented Apr. 13, 1971

[54] TOOL AND TOOL HOLDER
8 Claims, 6 Drawing Figs.
[52] U.S. Cl. .................................................. 82/36
[51] Int. Cl. ............................................. B23b 29/00
[50] Field of Search ......................................... 82/36, 37, 35

[56] References Cited
UNITED STATES PATENTS
3,250,160 5/1966 Lapp et al. .................... 82/36

FOREIGN PATENTS
343,746 2/1960 Switzerland .............. 82/36

Primary Examiner—Leonidas Vlachos
Attorney—Owen & Owen

ABSTRACT: The invention is directed to a shave tool and a shave tool holder for cutting and forming machines, e.g., screw machines. The tool has a transverse cross section which is shaped, in part, the same as the piece to be machined so that the tool can be sharpened merely by grinding an end portion thereof. Also, all but a small portion of the tool can be utilized. The tool holder has adjustments for accurately positioning the tool with respect to a workpiece, with all of the adjustments being readily accessible. The tool holder has a contoured surface supporting the tool, with the mating surfaces of the holder and tool positioning the more critical areas of the tool precisely with respect to the workpiece.

Patented April 13, 1971

INVENTORS:
Robert C. Zeller,
Warren W. Weible.
BY
ATT'YS.

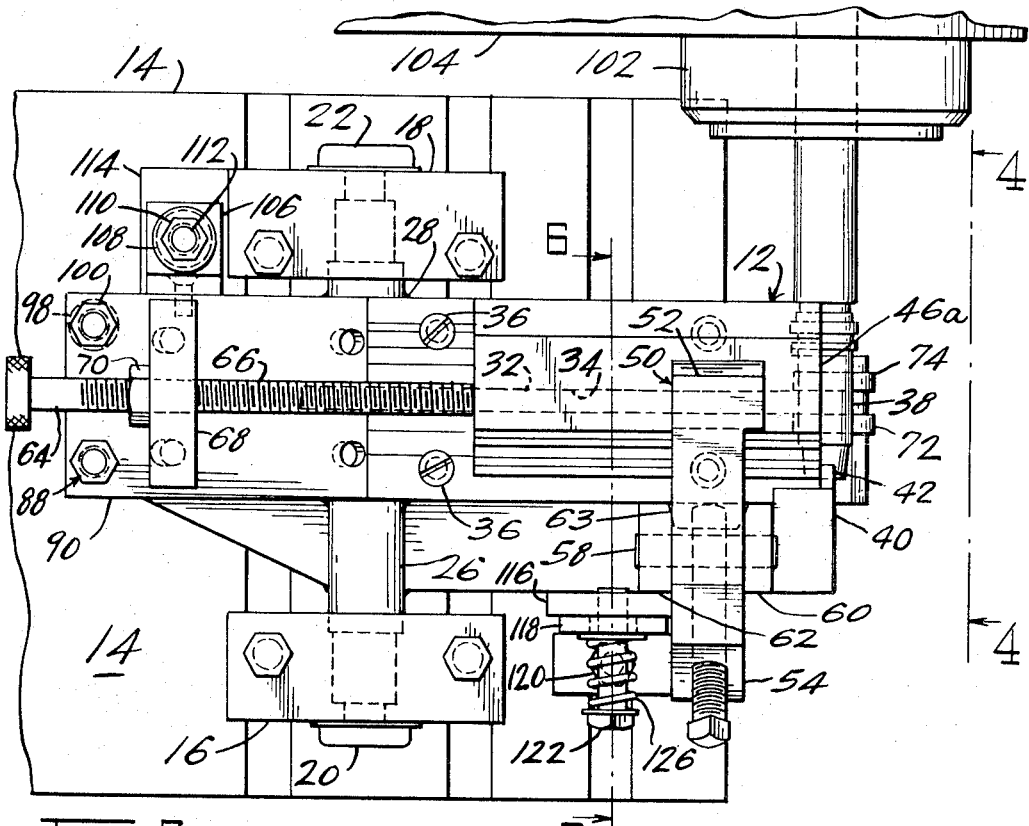
FIG-3-
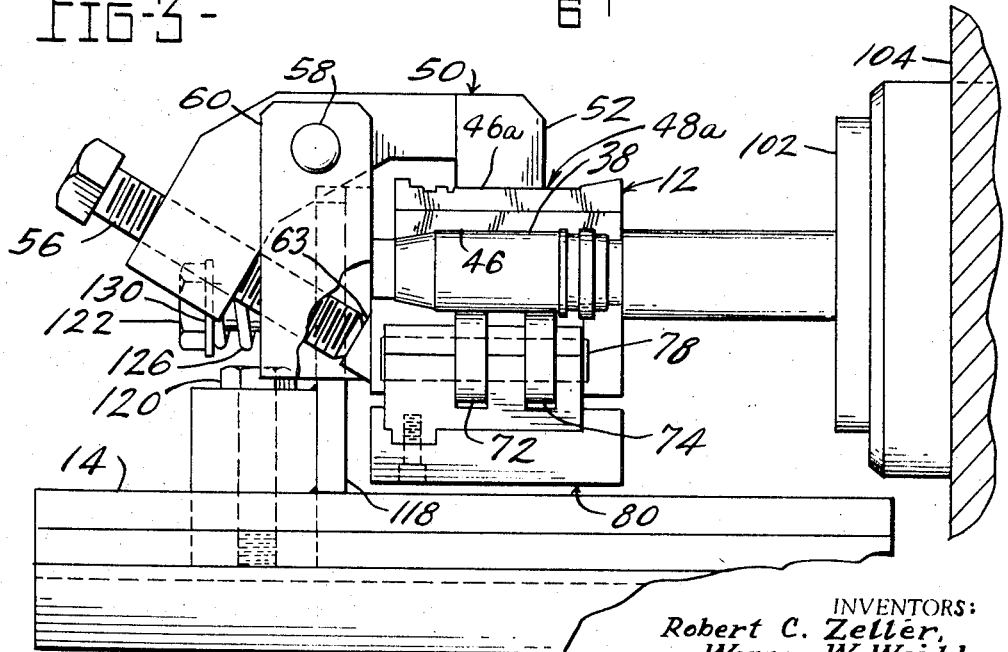
FIG-4-
INVENTORS:
Robert C. Zeller,
Warren W. Weible.
BY
ATT'YS.

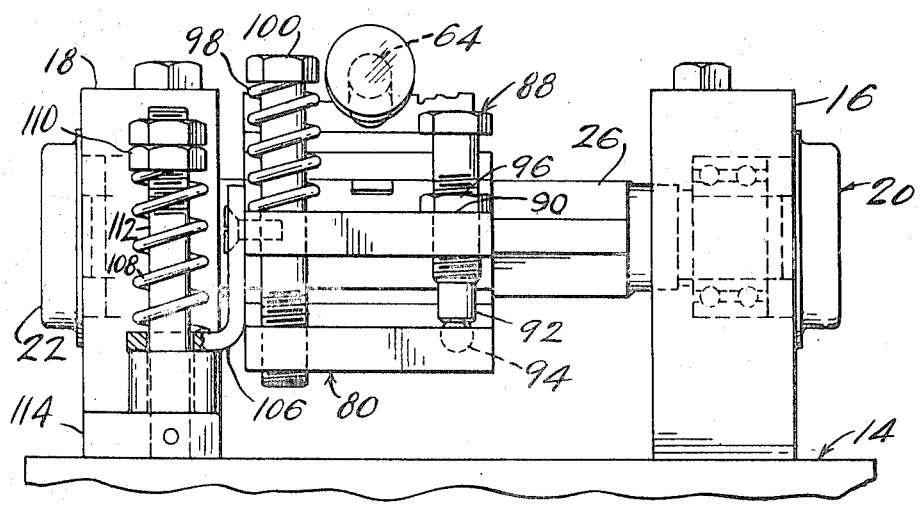
FIG-5-
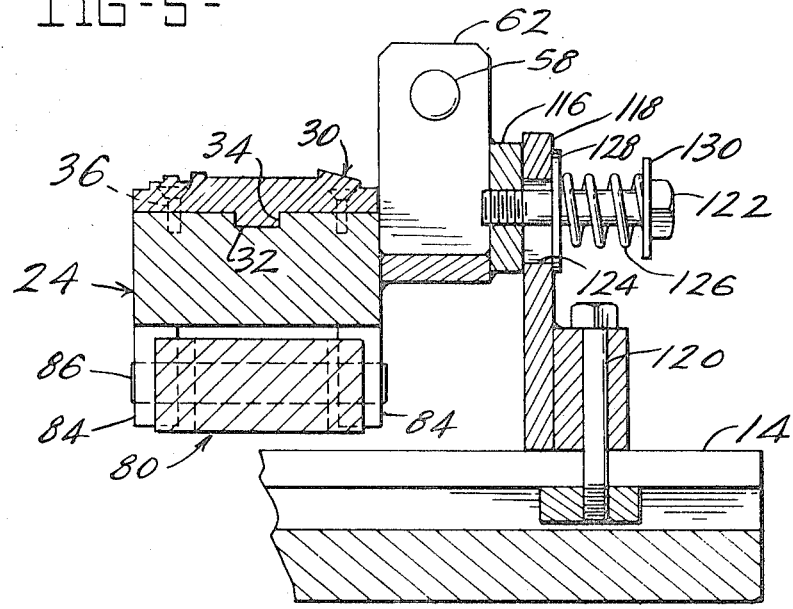
FIG-6-
INVENTORS:
Robert C. Zeller,
Warren W. Weible.
BY
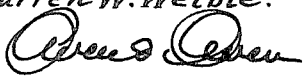
ATT'YS.

TOOL AND TOOL HOLDER

This is a division of copending application, Ser. No. 623,938 filed Mar. 17, 1967 and now U.S. Pat. No. 3,503,287.

BACKGROUND OF THE INVENTION

Shave tool holders heretofore known in the art have had a number of problems. When in operating position in a machine, the means for clamping the tool to the holder and adjustments therefor have been relatively inaccessible, rendering it difficult to replace the tool and to properly adjust the replacement. The known holders also have been susceptible to problems from chips from the machine, causing the holders to jam or the tools to be moved out of adjustment. These holders also have been difficult to adjust accurately so as to maintain the tools within close, desired tolerances. The tools used with the holders heretofore known also have had disadvantages. These tools generally have been held by the holders through dovetails which are expensive to make and machine accurately. The tools also have been of relatively short lengths and, with a relatively long portion of the tool being incapable of use due to the fact that it must be held by the holder, a substantial percentage of the tool is wasted.

SUMMARY OF THE INVENTION

In accordance with the present invention, the new tool holder overcomes the above disadvantages and has a number of additional advantages. The new tool holder is not hindered by chips, having no exposed surfaces which are susceptible to jamming by chips. The new tool holder is also capable of accurately positioning the tool without being thrown out of adjustment by small chips. Further, with the new tool holder, the adjustment for the tool is readily accessible and is capable of precisely adjusting the tool within very small tolerances. The clamping arrangement for holding the tool relative to the tool holder also is readily accessible and can be easily manipulated to tighten, adjust, or remove the tool. The new tool is contoured in a manner such as to provide two cutting edges, both of which can be used before resharpening is required. The new tool also can be substantially longer than those heretofore used and, with the same portion of tool being unuseable, a much smaller percentage of the overall tool is wasted.

It is, therefore, a principal object of the invention to provide an improved tool holder and tool therefor having the advantages outlined above.

Another object of the invention is to provide an improved shave tool holder and shave tool for use with a cutting or forming machine.

BRIEF DESCRIPTION OF THE DRAWINGS

Many other objects and advantages of the invention will be apparent from the following detailed description of a preferred embodiment thereof, reference being made to the accompanying drawings, in which:

FIG. 3 is a plan view of the apparatus of FIG. 2;

FIG. 4 is a front view in elevation of the tool and the tool holder shown operating on a workpiece taken along the line 4—4 of FIG. 3;

FIG. 5 is a rear view in elevation of the shave tool holder and tool; and

FIG. 6 is a view in vertical cross section taken along the line 6—6 of FIG. 3, but with the tool and a tool clamp removed.

DESCRIPTION OF THE PREFERRED EMBODIMENT

Figures 1, 2:
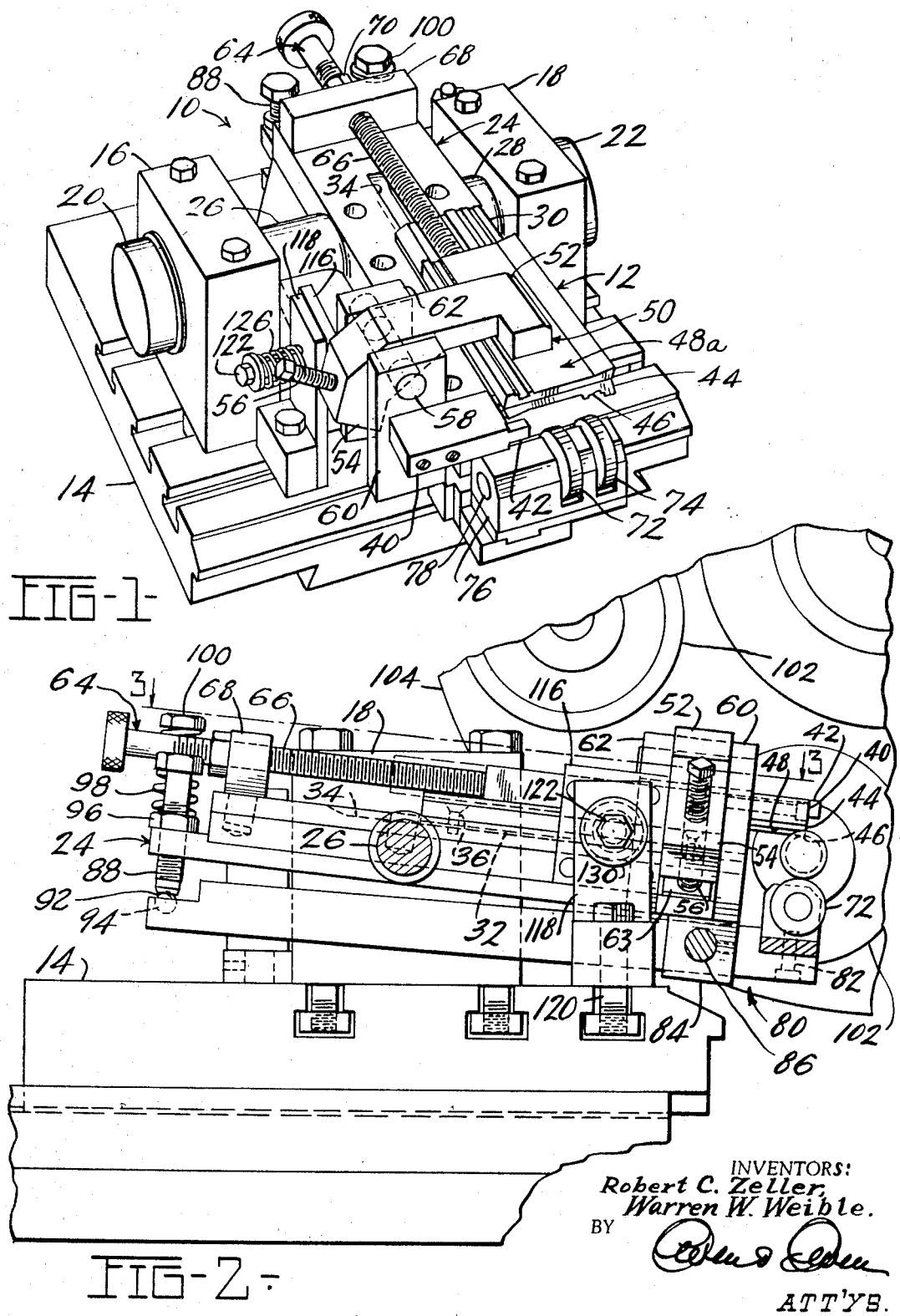
FIG. 1 is a view in perspective of a shave tool holder and a tool embodying the invention.
FIG. 2 is a fragmentary left-side view in elevation of the tool and the tool holder of FIG. 1 and showing a portion of a screw machine or other machine with which the tool and tool holder are used.

Referring to the drawings, a shave tool holder embodying the invention is indicated at 10 and includes a shave tool 12 also embodying the invention. The shave tool holder 10 is mounted on a main support or bed 14 of an automatic screw machine, forming lathe, or machine, for example, and can be fed toward and away from a workpiece, preferably with a fast approach feed and a slower rate of feed as the tool engages the work.

A pair of spaced bearing blocks 16 and 18 are mounted on the support 14 and carry enclosed and sealed bearings 20 and 22 and a main tool holder body 24 has outwardly extending bearing arms or shafts 26 and 28 which are rotatably received in the bearings. In this manner, the tool holder body 24 is pivotally moveable in a vertical plane around the bearing arms or blocks. A tool support or adapter 30 is located on the front or tool end of the body 24 and, as shown in FIG. 6, has an extension 32 received in a groove 34 in the body to aid in locating the tool support in the proper position, with the support then affixed to the body by threaded fasteners 36. The upper surface of the tool adapter 30 is complementary at least approximately to the shape of the tool 12 and corresponds to the profile of a product having circular cross sections; being made on the screw machine and being shaved to the final contour by the tool 12 from a workpiece 38.

The tool 12 is held in precise horizontal and vertical position by means of the adapter 30 but can be moved longitudinally thereof. The adapter is designed to cooperate with the cutting surfaces of the tool which produce the most critical areas of the part in such a manner as to ensure precise tool location and interchangeability. Proper selection and design of the mating surfaces will place the tool tolerances at less critical areas of the part being machined, while supporting more critical areas directly, so that tool interchangeability is enhanced over any other method of tool holding now known. To achieve the proper longitudinal positioning, a stop 40 is mounted on the forward or tool end of the holder body 24 and includes a stop tang 42 against which a cutting face 44 of the tool 12 abuts to properly position a cutting edge 46 thereof. The cutting edge 46 is formed by a slanted portion of the face 44 and a major, lower surface 48 fitting with the adapter 30 and contoured to the desired shape of the product. An upper surface 48a of the tool 12 is similarly contoured and cooperates with an upper slanted portion of the opposite face 44 of the tool 12 to form a second cutting edge 46a. In this manner, when the cutting edge 46 has become dull, the tool 12 can be turned over to replace the first cutting edge 46 with the second edge 46a at the upper side to double the service of the tool for a single sharpening operation.

To maintain the tool 12 in position on the adapter 30, a tool clamp 50 is employed. The clamp 50 is of L-shaped configuration, having an upper arm 52 which engages the upper surface of the tool 12 and a lower arm 54 which threadedly receives a clamping screw 56. An intermediate portion of the clamp has a pivot pin 58 located in side supporting bars 60 and 62. The clamping screw 56 extends completely through the lower leg 54 of the clamp and, when turned against a stop face 63 (FIG. 4) of the tool body, forces the lower leg 54 outwardly and the upper leg 52 downwardly against the upper tool surface to securely hold the tool 12 against the adapter 30.

While the clamp 50 maintains the tool 12 on the adapter 30, the longitudinal position of the tool 12 primarily is maintained by a backup screw 64 which engages the rear face of the tool 12 and maintains the tool against the stop tang 42. To accomplish this, the backup screw 64 has a thread 66 which extends through a supporting bar 68 of the tool holder body 24 and is maintained in position by a lock nut 70 after being turned against the rear face of the tool.

To position and guide the cutting edge 46 of the tool 12 relative to the workpiece 38, a pair of guide rollers 72 and 74 are located below the tool 12 with the spacing between the cutting edge 46 and the surfaces of the guide rollers determining the final diameter of the product. The rollers 72 and 74 are rotatably held in a mounting block 76 by an axle 78 with the block 76 mounted on an end of a guide lever 80 by screws 82. The lever 80 extends the full length of the tool holder body 24 and beyond the tool holder end thereof to a position such that the axes of the rollers 72 and 74 will be substantially directly under the cutting edge 46 of the tool. The lever 80 is pivotally carried by the tool holder body 24 and preferably is pivoted near the roller end thereof. For this purpose, a pair of side ears 84 extend downwardly from a forward portion of the tool holder body 24 to pivotally receive a pivot pin or axle 86 extending through the lever 80.

While the lever 80 can be pivoted at any point therealong relative to the tool holder body 24, by placing the pivot toward the tool end, a coarse adjustment of the rear end of the lever provides a fine, precise adjustment for the rollers 72 and 74. To adjust the lever relative to the tool holder body, an adjusting screw 88 (FIG. 5) is located at the end of the body opposite the tool. The adjusting screw 88 is threaded through a rear flange 90 of the tool holder body and has a recessed end 92 which engages a ball stop 94 in the end portion of the lever 80. When the screw 88 is adjusted to the desired position, it is held by a lock nut 96. By employing a fine thread on the adjusting screw 88, and with the leverage provided for the lever 80, extremely close adjustment of the positioning rollers 72 and 74 can be attained, with the central, uniform contact between the recessed end 92 and the ball stop 94 aiding in achieving the fine adjustment. With this arrangement, or example, a one-sixth turn of the screw 88, to move the flats of the hex-head around one position, can change the position of the rollers by only 0.001 inch.

The adjusting screw 88 is maintained against the ball stop 94 under spring pressure by means of a coiled spring 98 extending around a retaining screw 100 and maintained under compression between the head of the screw and the flange 90. The screw 100 is threaded into the end of the lever 80 for this purpose.

Not only does the lever 80 enable the rollers 72 and 74 to be accurately positioned, but the screw 88 also is readily accessible to the operator of the machine for adjustment, unlike the tool holders heretofore known in which any adjustment was obtained through screws located at the tool end of the holder and, further, usually accessible only from below. A resilient material such as a plastic foam (not shown) can be placed in the space between the lever 80 and the tool holder body 24. This prevents the entry of chips which would jam the lever and limit or prevent proper adjustment.

The workpiece 38 is carried by a collet or chuck 102 which is rotated by suitable means (not shown) to rotate the workpiece 38 relative to the tool 12 and other tools located at different stations constituting part of the machine. The chuck and the workpiece are then rotated from station to station by a large rotating member 104, with an appropriate machining operation taking place at each station. Unfortunately, the workpiece is not precisely positioned uniformly at each station so that it is not possible simply to move the shave tool 12 in and out along a fixed path relative to the workpiece to perform the machining operation thereon. In such an instance, if the workpiece were positioned too high, the resulting diameter of the product would be too small, while if positioned too low relative to the tool, the diameter would be too large. Consequently, the tool holder body 24 and the lever 80 along with the tool 12 and the rollers 72 and 74 are pivotally mounted relative to the supporting bed 14 by means of the bearings 20 and 22. Thus, when the rollers 72 and 74 contact the lower portion of the workpiece, they move downwardly along with the tool 12, with the tool holder body 24 pivoting slightly about the axis of the bearings 20 and 22. The tool holder is so positioned that the lower portion of the workpiece will be contacted by the rollers and pivot the tool body and tool regardless of whether the workpiece is stopped slightly above or below the desired position. This will always assure that the rollers do the positioning for the tool and that a constant diameter product, as determined by the spacing between the rollers and tool, will result. When the holder is used in a multiple spindle-type machine known in the trade as a screw machine or chucker, versus its application to other machines, it will have a direct improvement on the precision of the finished diameters accomplished due to its ability to compensate for spindle bearing wear and looseness, slide wear, chucking holder alignment and wear, as well as index verification on multiple-type machines. In addition, it will automatically compensate for working clearances that are always required in the operating mechanisms of all machine applications due to temperature variations of both thermal contraction and expansion of all materials.

As shown in FIG. 5, the tool holder 10 is maintained with the tool in the upper position by an L-shaped flange 106 fastened to a rear portion of the tool holder body 24 and urged downwardly by a compression spring 108 located between the flange and a pair of seating nuts 110. The nuts 110 are carried by a guide rod 112 which extends upwardly from a mounting body 114 located on the bed 14.

Occasionally, there may be a tendency for the tool to chatter as the tool holder moves toward the work and the rollers 72 and 74 contact the workpiece and pivot the tool 12 downwardly. To prevent this, a pair of friction plates can be used between the support and the tool holder to dampen the movement of the holder and eliminate the chattering. As shown in FIG. 6, a first friction plate 116 moves with the tool holder body 24 while a second friction plate 118 is mounted on the bed 14 by a bolt 120. The plates are urged toward one another by a friction screw 122 threadedly engaged in the plate 116 and extending through a slot 124 in the second plate 118. A compression spring 126 is located between seating washers 128 and 130 and urges the second plate 118 against the first plate 116, with the friction therebetween being controlled by the extent to which the screw 122 is turned into the plate 116 to vary the compression of the spring 126.

From the above, it will be seen that the tool holder 10 and the tool 12 have many advantages over those heretofore known. The tool holder 10 assures accurate positioning of the tool 12 by virtue of the spaced bearings 20 and 22 which position the tool holder body 24 relative to the workpiece. The tool adapter 30 also assures accurate positioning of the tool 12 relative to the body 24 and the clamp 52, with the clamping screw 56 providing ready access for clamping and removing the tool. In addition, there is virtually no possibility that the tool can be jammed by chips resulting from the operation. The arrangement of the lever 80 also provides precise positioning of the rollers 72 and 74 relative to the tool 12 while the rear adjusting screw 88 provides accurate and easily accessible adjustment. The tool 12 itself, capable of being almost any length, reduces the percent of waste thereof, while the end-face arrangement provides two cutting edges, both of which can be used prior to removing and returning the tool to the appropriate location for sharpening. The sharpening operation itself is also simple since the sharpening can be achieved simply by grinding back the end face slightly.

Various modifications of the above described embodiment of the invention will be apparent to those skilled in the art, and it is to be understood that such modifications can be made without departing from the scope of the invention, if they are within the spirit and the tenor of the accompanying claims.

We claim:

1. A shave tool holder for a shave tool, said holder comprising a tool holder body, a tool adapter on said tool holder body affixed near the working end thereof, said adapter having a top surface contoured at least in part to the profile shape of a product of circular cross section that is to be machined by a shave tool to be carried by said tool holder, and being engaged with predetermined portions of the tool whereby said adapter is capable of accurately positioning the tool transversely of the holder and axially of the product, means for clamping the tool on said adapter, stop means carried by said tool holder body and extending beyond an end thereof to position the shave tool relative to said body and radially relative to the axis of rotation of the product, and means carried by said body and adapted to contact the tool to back up the tool on said adapter during a machining operation.

2. A holder according to claim 1 characterized by said clamping means comprising an arm having a clamping end, means carried by said tool holder body for pivotally supporting said arm, a threaded rod extending through the end of said arm opposite the clamping end for engaging a portion of said tool holder body to force the associated end outwardly and thereby force the clamping end of the arm toward said adapter.

3. A holder according to claim 1 further characterized by stop means carried by said body and said backup means comprising a screw threadedly engaged with a portion of said body at the end portion opposite the adapter and engageable with a rear end surface of a tool to hold a cutting end surface of the tool against the stop during a machining operation.

4. A holder according to claim 1 wherein the contoured surface of said tool adapter has the cooperating portions at positions corresponding to those portions of the product requiring close tolerances.

5. A tool holder assembly for a cutting or forming machine, said assembly comprising a main tool support, said support having a surface contoured at least in part to the profile shape of a product having circular cross sections that is to be machined, a tool having a major, noncutting support surface mating at least in part with said contoured surface of said support, said major surface being equal in axial size and profile shape to the shape of the product to be machined said tool having an end portion cooperating with said major surface to provide a cutting edge, and means for holding said tool firmly in engagement with said tool support.

6. An assembly according to claim 5 wherein the contoured surface of said tool support has the mating portions at positions corresponding to portions of the product requiring close tolerances.

7. A tool holder assembly according to claim 5 wherein said major surface of said tool extends longitudinally over at least a substantial portion of the length of said tool and said contoured surface of said support extends in the same direction whereby said tool can be moved longitudinally on said support to adjust for wear of the tool without changing the transverse position of the tool relative to said support.

8. A tool holder assembly according to claim 7 characterized by a main tool holder body on which said support is mounted, and means mounted on said tool holder body for backing up said tool and for adjustably changing the longitudinal position of said tool relative to said support.